United States Patent
Lin et al.

(10) Patent No.: US 11,268,608 B2
(45) Date of Patent: Mar. 8, 2022

(54) BALL SCREW WITH A LOAD CONDITION FEEDBACK MECHANISM

(71) Applicant: HIWIN TECHNOLOGIES CORP., Taichung (TW)

(72) Inventors: Yu-Hsin Lin, Taichung (TW); Chi-Ying Yen, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 207 days.

(21) Appl. No.: 16/518,295

(22) Filed: Jul. 22, 2019

(65) Prior Publication Data

US 2021/0025485 A1  Jan. 28, 2021

(51) Int. Cl.
*G01L 5/24* (2006.01)
*F16H 57/01* (2012.01)
*F16H 25/20* (2006.01)

(52) U.S. Cl.
CPC ............. *F16H 57/01* (2013.01); *F16H 25/20* (2013.01); *G01L 5/24* (2013.01); *F16H 2057/012* (2013.01)

(58) Field of Classification Search
CPC .... F16H 25/20; F16H 57/01; F16H 2057/012; G01L 13/1464; G01L 15/24
See application file for complete search history.

(56) References Cited

U.S. PATENT DOCUMENTS

| | | | | |
|---|---|---|---|---|
| 5,644,951 | A * | 7/1997 | Hatamura | B23Q 1/34 74/424.72 |
| 6,200,036 | B1 * | 3/2001 | Girardey | B65G 23/44 384/260 |
| 6,968,752 | B2 * | 11/2005 | Shimada | F16H 25/24 74/89.23 |
| 2015/0096397 | A1 * | 4/2015 | Jeng | G01L 5/0061 74/424.82 |
| 2015/0184729 | A1 * | 7/2015 | Jeng | G01L 5/0071 74/424.82 |

FOREIGN PATENT DOCUMENTS

| | | | | |
|---|---|---|---|---|
| CA | 2201659 | A1 * | 10/1997 | ............. B23Q 5/408 |
| CN | 104368967 | A  * | 2/2015 | |
| CN | 106884948 | A  * | 6/2017 | |
| CN | 109973601 | A  * | 7/2019 | |
| DE | 1124729 | A | 3/1962 | |

(Continued)

OTHER PUBLICATIONS

Office Action issued to foreign application No. 10-2019-0090688 dated Sep. 14, 2020.

(Continued)

*Primary Examiner* — Bobby Rushing, Jr.
(74) *Attorney, Agent, or Firm* — Rosenberg, Klein & Lee

(57) ABSTRACT

A ball screw mountable on a mounting bed includes a screw shaft having a cylindrical shaft body which extends along an axis, and a helical external groove which is provided on the shaft body, a ball nut having a carrier seat which is rotatably sleeved around the shaft body and which has a carrier portion for carrying the mounting bed, and at least one reaction force sensing module attached to the carrier seat and configured to abut against the mounting bed for measuring a reaction force exerted on the mounting bed by the ball nut during displacement of the ball nut along the screw shaft.

2 Claims, 11 Drawing Sheets

(56) References Cited

FOREIGN PATENT DOCUMENTS

| | | | | |
|---|---|---|---|---|
| DE | 1929478 | A | 2/1970 | |
| DE | 3437246 | A1 | 4/1986 | |
| EP | 0377145 | A2 | 7/1990 | |
| JP | H05138481 | A | 6/1993 | |
| JP | 2002-347071 | A | 12/2002 | |
| JP | 2015-59819 | A | 3/2015 | |
| JP | 2015043688 | A * | 3/2015 | ............ B30B 1/186 |
| JP | 2016-223493 | A | 12/2016 | |
| JP | 2017-136820 | A | 8/2017 | |
| JP | 2018-40777 | A | 3/2018 | |
| KR | 10-2009-0108031 | A | 10/2009 | |
| KR | 10-1999267 | B1 | 7/2019 | |
| TW | 201337233 | A | 9/2013 | |
| TW | 201504544 | A | 2/2015 | |
| TW | I513927 | B | 12/2015 | |
| TW | 201617534 | A | 5/2016 | |
| TW | I648488 | B | 1/2019 | |

OTHER PUBLICATIONS

Office Action issued to foreign application No. 2019-147422 dated Oct. 13, 2020.
Office Action issued to German counterpart application No. 102019211235.8 by the GPTO dated Mar. 26, 2020.
Search Report Issued in Foreign Application No. 108117982 dated Oct. 2, 2019.
Search Report appended to an Office Action, which was issued to Chinese counterpart application No. 201910516301.2 by the CNIPA dated May 28, 2021.
Search Report appended to an Office Action, which was issued to Chinese counterpart application No. 201910516301.2 by the CNIPA dated Oct. 11, 2021 with an English translation thereof.

* cited by examiner

BALL SCREW WITH A LOAD CONDITION FEEDBACK MECHANISM

FIELD

The disclosure relates to a ball screw and more particularly to a ball screw with a load condition feedback mechanism.

BACKGROUND

A conventional ball screw as disclosed in TW 1513927 includes a screw shaft, a ball nut assembly rotatably sleeved around the screw shaft, and two parallelism sensors disposed on the ball nut assembly. The ball nut assembly has two ball nuts coupled with each other in the axial direction of the screw shaft. The parallelism sensors are arranged between the ball nuts and radially opposite to each other relative to the screw shaft to detect the preload between the ball nuts so as to determine the parallelism of the screw shaft. By comparing the pressure values measured by the parallelism sensors, the parallelism of the screw shaft can be monitored in real time. However, the ball nuts are coupled with each other to have the parallelism sensors sandwiched therebetween, thus having less rigidity and reduced precision.

SUMMARY

Therefore, an object of the disclosure is to provide a ball screw that can alleviate at least one of the drawbacks of the prior art.

According to the disclosure, the ball screw is mountable on a mounting bed which is movable in a lengthwise direction, and includes a screw shaft, a ball nut and at least one reaction force sensing module. The screw shaft includes a cylindrical shaft body which extends along an axis, and a helical external groove which is provided on the shaft body and helically extends about the axis. The ball nut includes a carrier seat which is rotatably sleeved around the shaft body and on which the mounting bed is disposed. The carrier seat has a carrier portion by which the mounting bed is carried. The reaction force sensing module is attached to the carrier seat and is configured to abut against the mounting bed for measuring a reaction force exerted on the mounting bed by the ball nut during displacement of the ball nut along the screw shaft.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
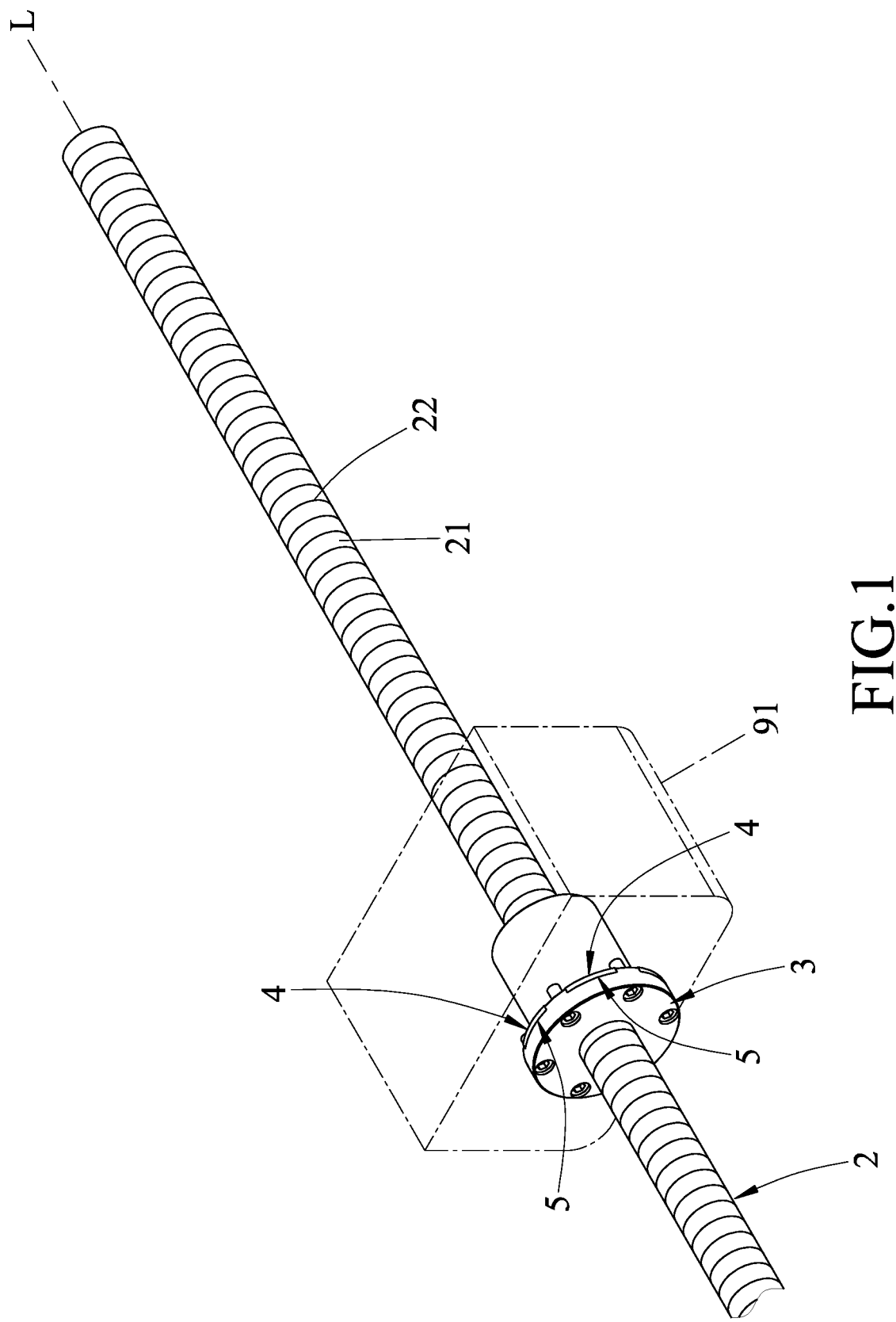
FIG. 1 is a fragmentary perspective view illustrating a first embodiment of a ball screw according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
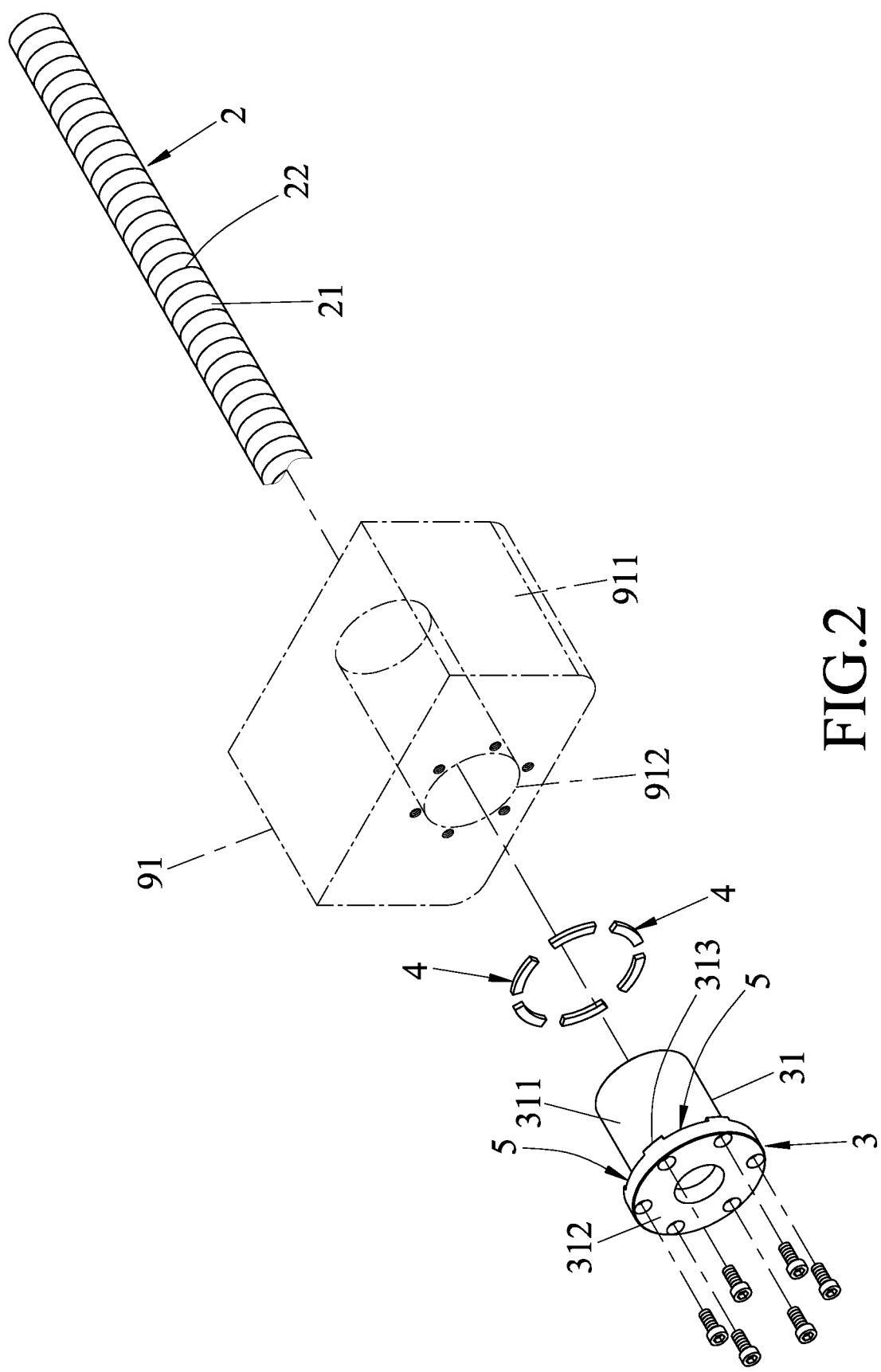
FIG. 2 is an exploded perspective view of the first embodiment.
Figure 3:
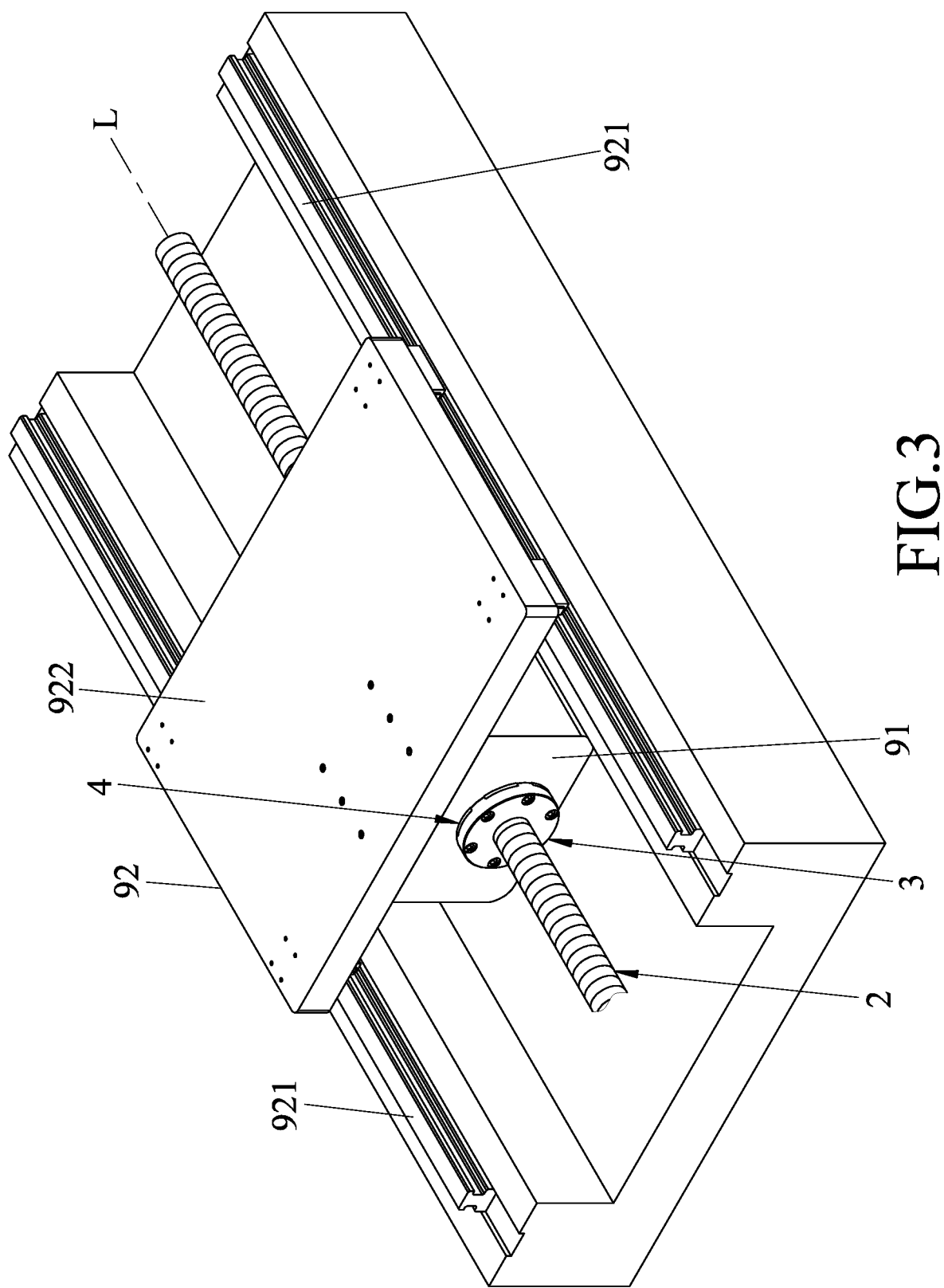
FIG. 3 is a partially fragmentary perspective view illustrating the first embodiment mounted on a mounting bed and a guide rail assembly.

Referring to FIGS. 1 to 3, a first embodiment of a ball screw according to the disclosure is mountable on a mounting bed 91. The mounting bed 91 has a base seat 911 and a mounting hole 912 which extends through the base seat 911 in a lengthwise direction. The ball screw includes a screw shaft 2, a ball nut 3, six reaction force sensing modules 4 and six mounting notches 5.

The screw shaft 2 includes a cylindrical shaft body 21 which extends along an axis (L), and a helical external groove 22 which is provided on the shaft body 21 and helically extends about the axis (L).

The ball nut 3 includes a carrier seat 31 which is rotatably sleeved around the shaft body 21 and on which the mounting bed 91 is disposed. The carrier seat 31 has a carrier portion 311 which can be disposed in the mounting hole 912 to carry the mounting bed 91, and a flange portion 312 which is connected to and opposite to the carrier portion 311 in a direction of the axis (L) and which can abut against the mounting bed 91 when the carrier portion 311 is disposed in the mounting hole 912.

The flange portion 312 has a cross-section which is transverse to the direction of the axis (L) and which is dimensioned larger than a cross-section of the carrier portion 311 that is transverse to the direction of the axis (L) to form a shoulder surface 313 adjoined with the carrier portion 311 and facing the direction of the axis (L).

The reaction force sensing modules 4 are attached to the carrier seat 31 and configured to abut against the mounting bed 91 for measuring a reaction force exerted on the mounting bed 91 by the ball nut 3 during displacement of the ball nut 3 along the screw shaft 2. The reaction force sensing modules 4 are respectively received in the mounting notches 5. In this embodiment, each reaction force sensing module 4 is made of a strain gauge.

Each mounting notch 5 is formed in the flange portion 312 and concaved from the shoulder surface 313 and adjacent to a periphery of the flange portion 312. The mounting notches 5 are angularly displaced from each other about the axis (L) for respectively receiving the reaction force sensing modules 4. Each reaction force sensing module 4 has a first side engaged with the shoulder surface 313, and a second side opposite to the first side in the direction of the axis (L) and abutting against the mounting bed 91.

Figure 4:
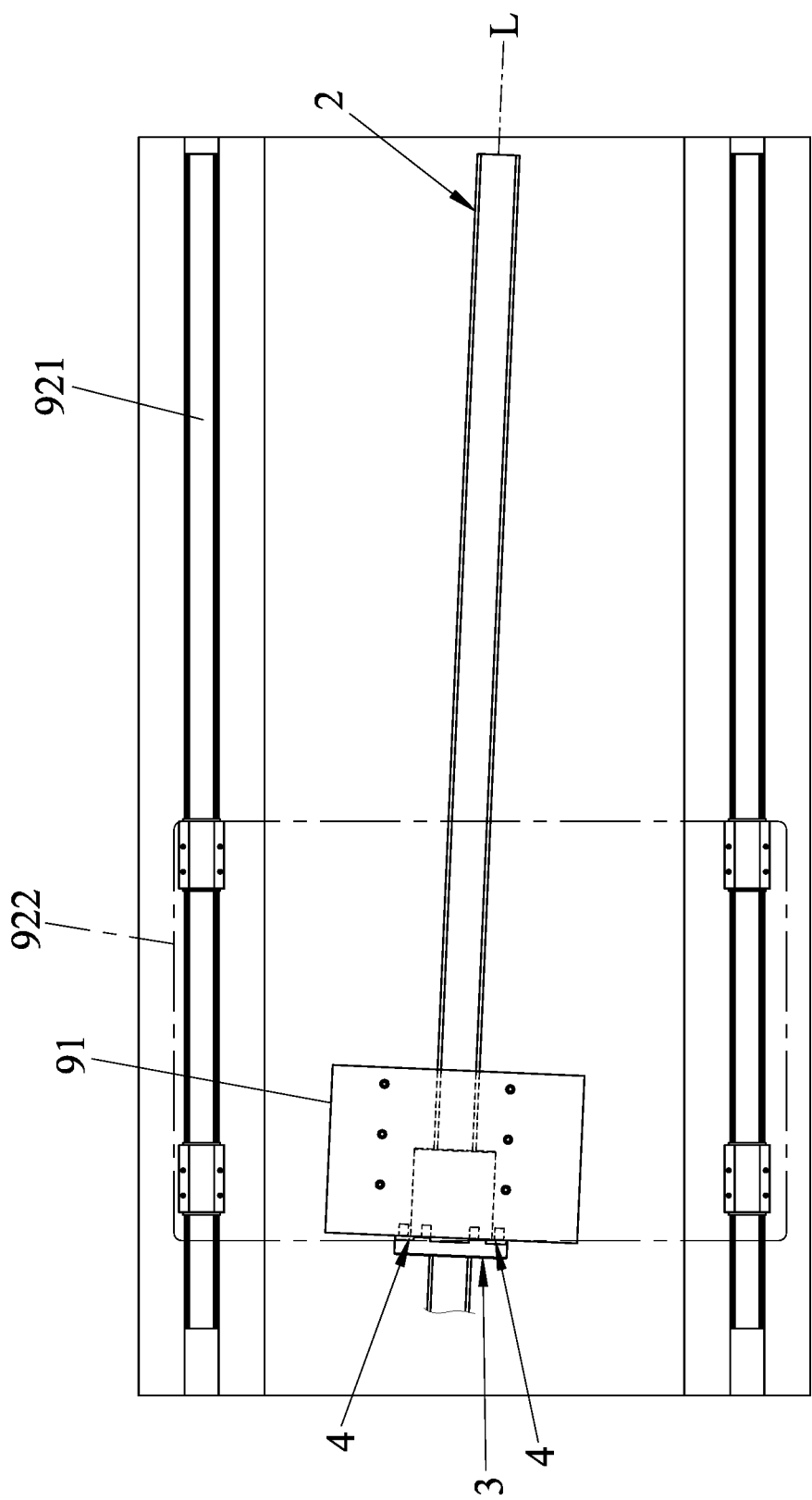
FIG. 4 is a schematic view illustrating a ball nut of the ball screw moved to a first position.
Figure 5:
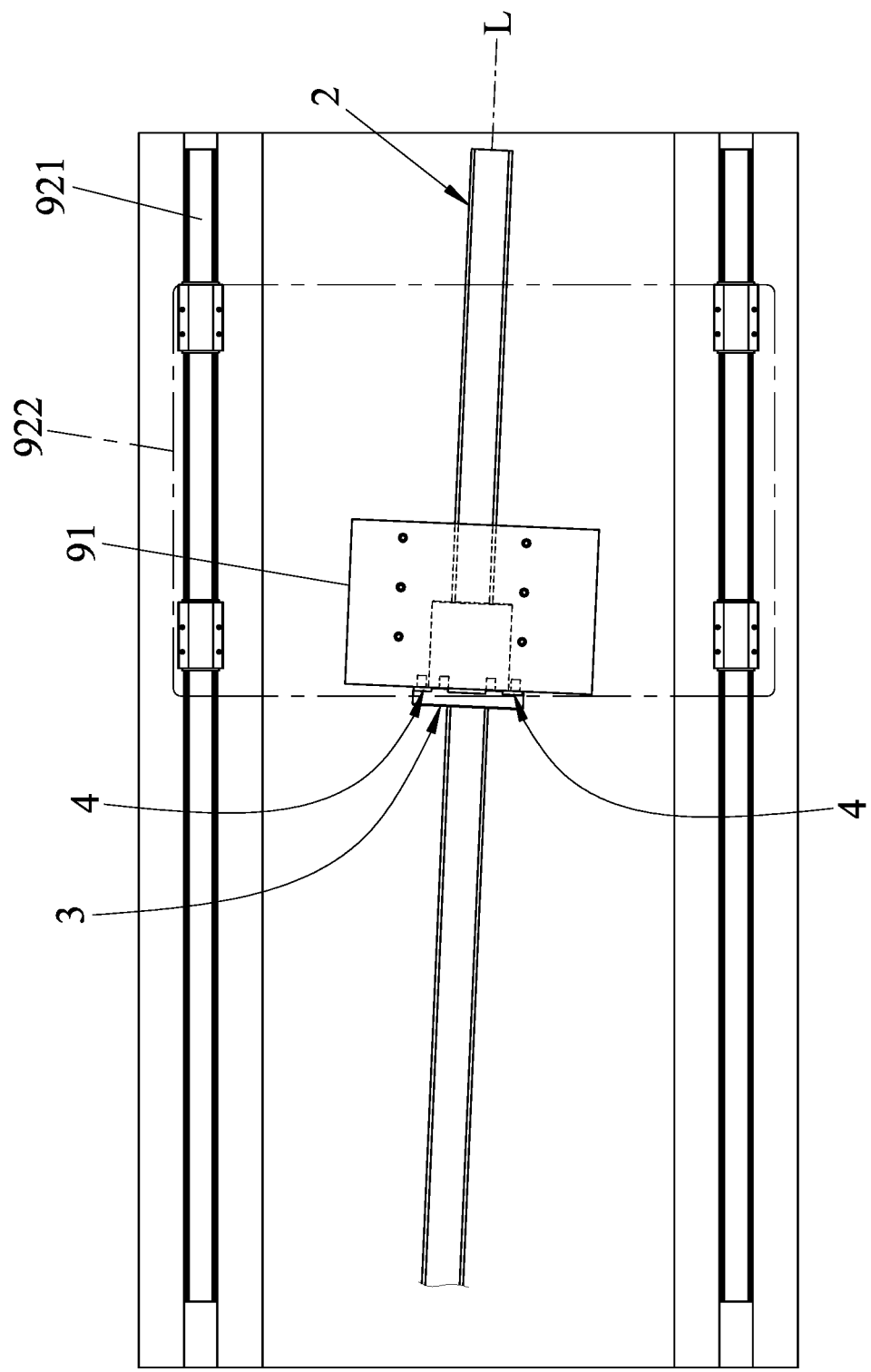
FIG. 5 is a schematic view illustrating the ball nut moved to a second position.

In use, referring to FIGS. 3 to 5, with a control unit (not shown) electronically connected with the reaction force sensing modules 4, the ball screw can be used to perform a detecting process for determining a deflection of the screw shaft 2. In this detecting process, the mounting bed 91 is disposed to a guide rail assembly 92. The guide rail assembly 92 has two guide rails 921 elongated in the lengthwise direction and a saddle 922 that is movable on the guide rails 921 and connected with the mounting bed 91. The screw shaft 2 is driven to rotate by a drive motor (not shown) that is electronically connected with the control unit to move reciprocatively the ball nut 3 along the screw shaft 2 (i.e., along the axis (L)).

By rotation of the screw shaft 2, the mounting bed 91 is movable with the ball nut 3 along the guide rails 921 to a first position (see FIG. 4), where a reaction force exerted on the mounting bed 91 by the ball nut 3 is measured by the reaction force sensing modules 4 and a first force value representing thereof is recorded by the control unit. Then, the ball nut 3 is further movable to a second position (see FIG. 5), where a reaction force exerted on the mounting bed 91 by the ball nut 3 is measured by the reaction force sensing modules 4 and a second force value representing thereof is recorded by the control unit.

The control unit determines the deflection of the screw shaft 2 in accordance with the first and second force values. In this embodiment, when the second force value is smaller than the first force value, an extension of the screw shaft 2 from the first position to the second position and a deflection of the axis (L) of the screw shaft 2 away from the corresponding reaction force sensing module 4 at the second position are determined. When the second force value is larger than the first force value, an extension of the screw shaft 2 from the first position to the second position and a deflection of the axis (L) of the screw shaft 2 closer to the corresponding reaction force sensing module 4 at the second position are determined. The determined deflection result of the control unit can be displayed on a screen or a light alarm to inform the user.

For example, as shown in FIGS. 4 and 5, the screw shaft 2 is deviated from the upper left toward the lower right such that the reaction force exerted on the mounting bed 91 by the ball nut 3 is applied to the reaction force sensing modules 4. When the ball nut 3 is moved from the first position at the left side to the second position at the right side, with the movement of the saddle 922 along the guide rails 921, the reaction force sensing module 4 at the upper side receives the force. Meanwhile, since the guide rails 921, the saddle 922 and the mounting bed 91 have the structural rigidity higher than that between the mounting bed 91 and the ball nut 3, the mounting bed 91 forces the ball nut 3 moving in the lengthwise direction of the guide rails 921 so as to have the first force value larger than the second force value. Thus, during the movement from the first position to the second position, the force received by the corresponding reaction force sensing module 4 is gradually reduced, which indicates that the axis (L) of the screw shaft 2 is deviated away from the corresponding reaction force sensing module 4, i.e., the right side of the screw shaft 2 is deflected downwardly in the drawing.

Also, when the ball nut 3 is moved from the first position at the left side to the second position at the right side, the reaction force sensing module 4 at the lower side receives the reaction force applied to the ball nut 3 by the mounting bed 91 so as to have the first force value measured by the corresponding reaction force sensing module 4 smaller than the second force value. Thus, during the movement from the first position to the second position, the force received by the corresponding reaction force sensing module 4 is gradually increased, which indicates that the axis (L) of the screw shaft 2 is deviated closer to the corresponding reaction force sensing module 4, i.e., the right side of the screw shaft 2 is deflected downwardly in the drawing.

The measuring results of the reaction force sensing modules 4 can be provided to generate a precise determination by the control unit. In alternative embodiments, only one reaction force sensing module 4 may be provided.

With the reaction force sensing modules 4 for measuring the reaction force, the parallelism of the screw shaft 2 can be monitored in real time. There is no need to provide the two ball nuts as taught by the conventional ball screw. The structure of the ball screw according to the disclosure has a higher rigidity to thereby improve the accuracy of use. With each reaction force sensing module 4 capable of providing feedback on the load condition, it is not necessary to use two parallelism sensors, which renders operation convenient and flexible.

The number of the reaction force sensing modules 4 and the mounting notches 5 may be varied. For instance, four or more reaction force sensing modules 4 and four or more mounting notches 5 may be provided.

Figure 6:
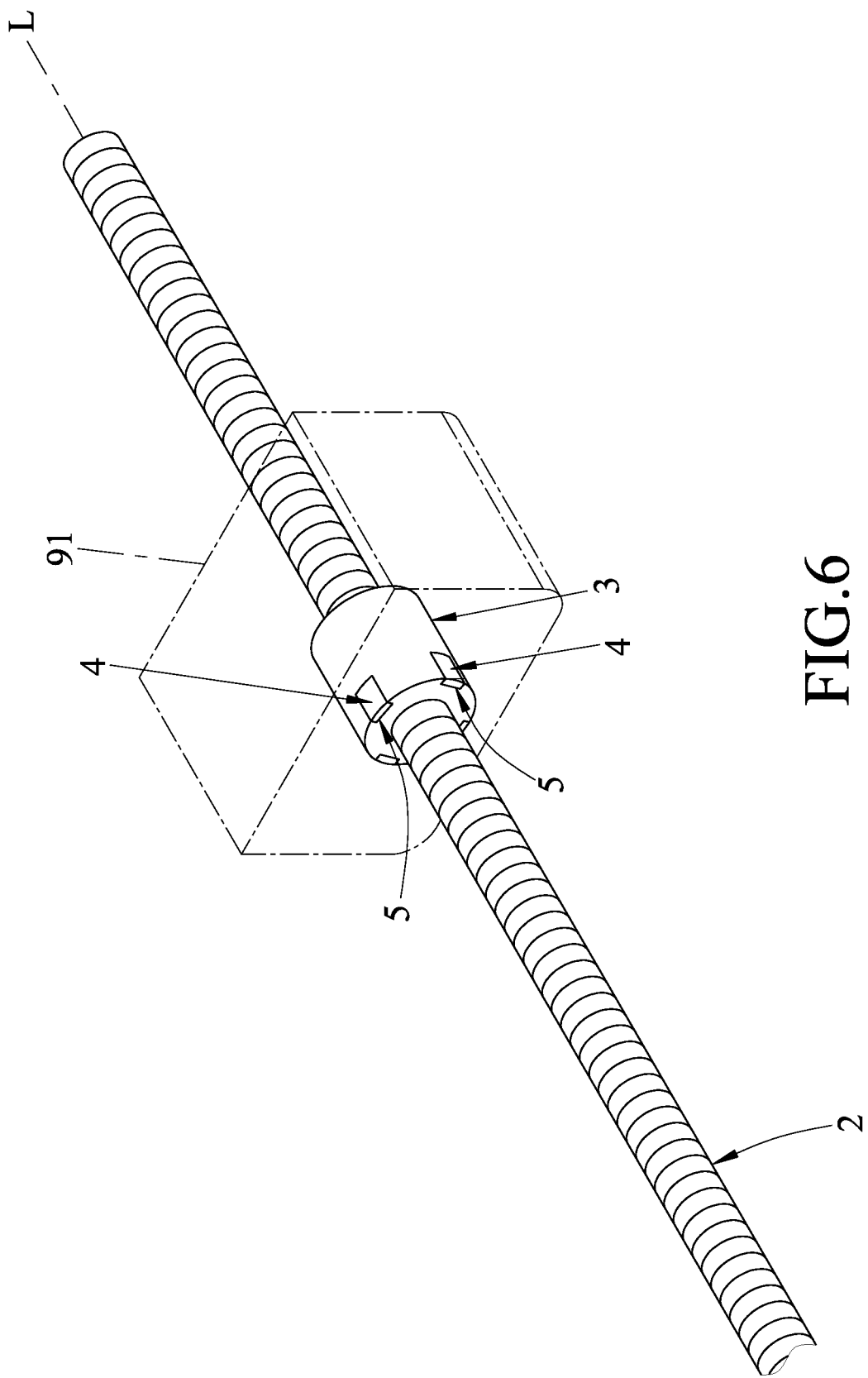
FIG. 6 is a fragmentary perspective view illustrating a second embodiment of the ball screw.
Figure 7:
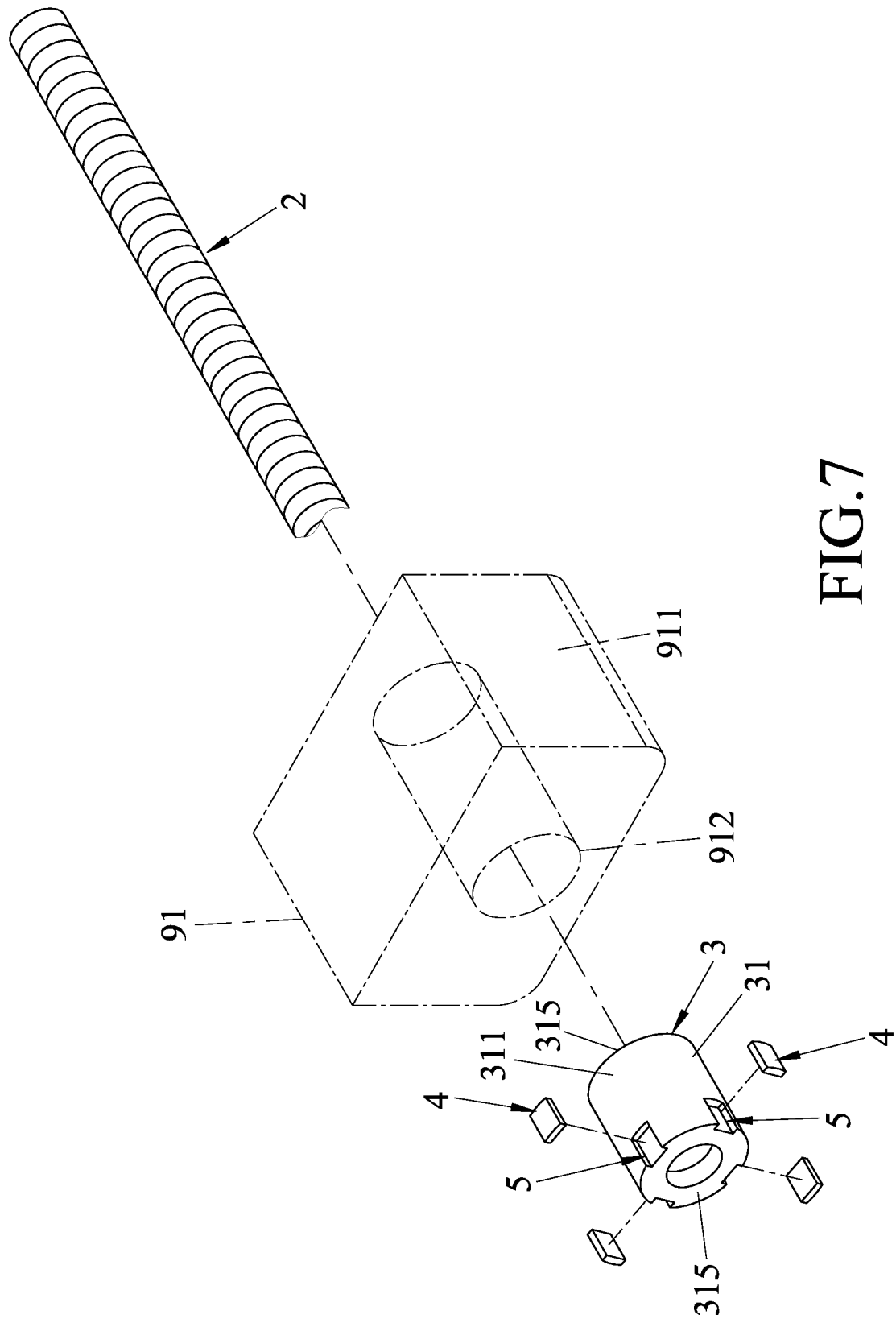
FIG. 7 is an exploded perspective view of the second embodiment.

Referring to FIGS. 6 and 7, in a second embodiment, the carrier seat 31 has the carrier portion 311, but the flange portion 312 is omitted. The carrier portion 311 extends along the axis (L) to terminate at two end surfaces 315. Four of the reaction force sensing modules 4 and four of the mounting notches 5 are provided and angularly displaced from each other about the axis (L). Each of the mounting notches 5 is formed in the carrier portion 311 and concaved from one end surface 315 and adjacent to a periphery of the end surface 315. The reaction force sensing modules 4 are respectively received in the mounting notches 5, and each have a first side which is engaged with the carrier portion 311, and a second side which is opposite to the first side in a direction transverse to the axis (L) and which abuts against the mounting bed 91.

Figure 8:
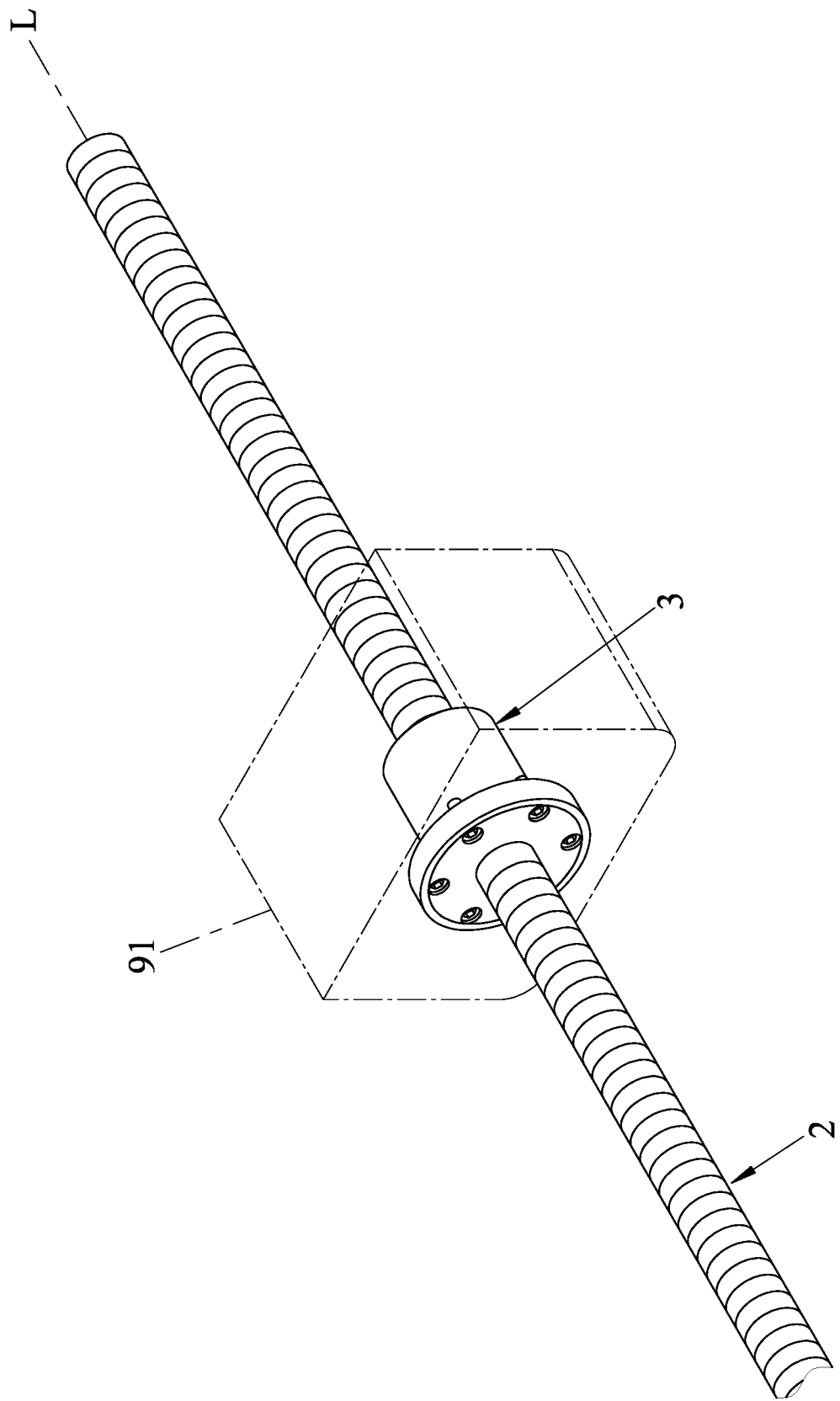
FIG. 8 is a fragmentary perspective view illustrating a third embodiment of the ball screw.
Figure 9:
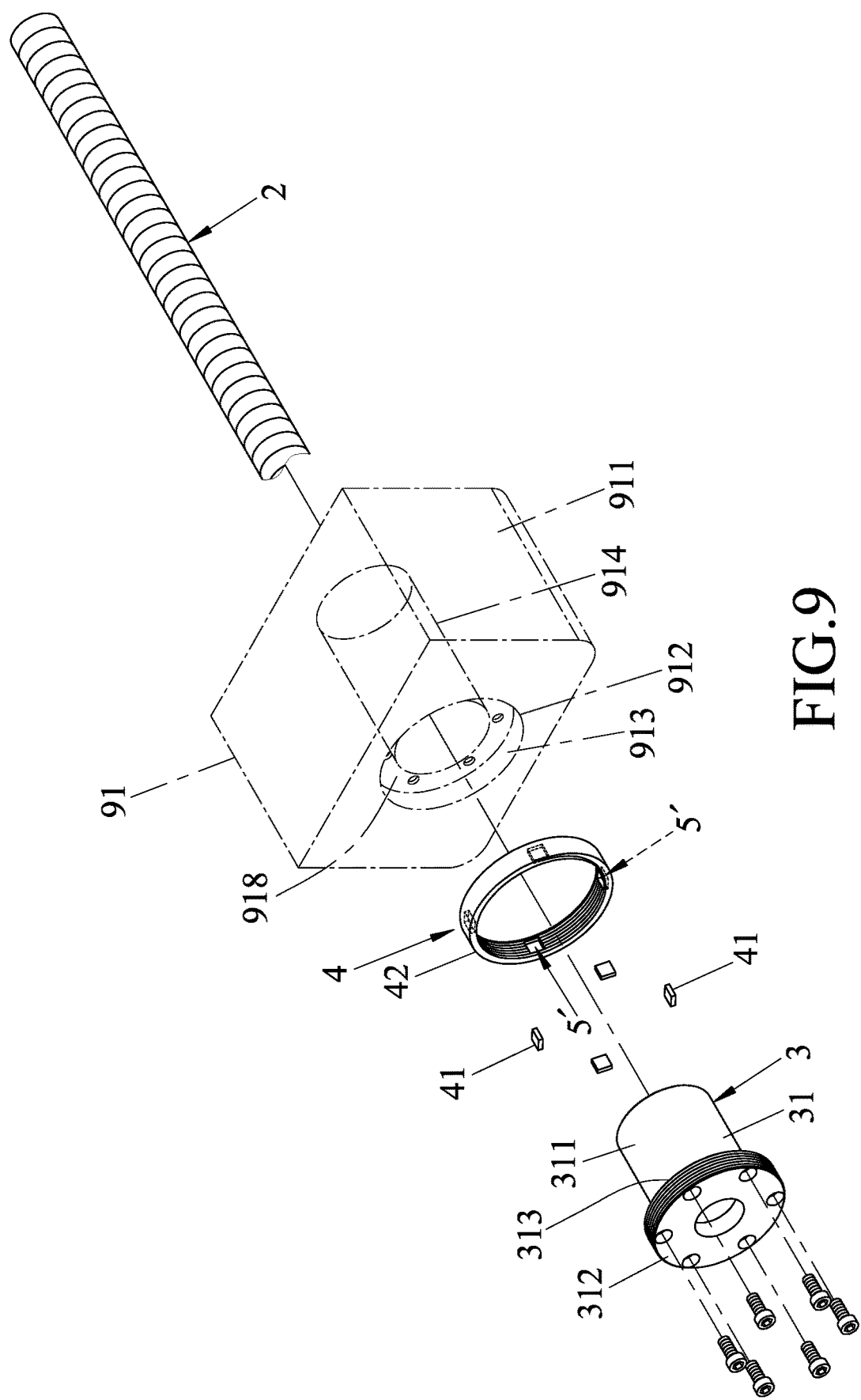
FIG. 9 is an exploded perspective view of the third embodiment.

Referring to FIGS. 8 and 9, in a third embodiment, the mounting hole 912 in the mounting bed 91 has a larger-diameter section 913 and a smaller-diameter section 914 opposite to each other, and an abutting surface 918 between the larger-diameter section 913 and the smaller-diameter section 914. The carrier portion 311 and the flange portion 312 of the carrier seat 31 are disposed in the smaller-diameter section 914 and the larger-diameter section 913, respectively.

The ball screw of this embodiment includes one reaction force sensing module 4. The reaction force sensing module 4 includes a sleeve ring 42 which surrounds the axis (L), and four force sensing units 41 which are connected to and disposed on an inner peripheral surface of the sleeve ring 42 and which are angularly displaced from each other about the axis (L). The sleeve ring 42 is sleeved on and threadedly engaged with a periphery of the flange portion 312, and abuts against the abutting surface 918. The inner peripheral surface of the sleeve ring 42 has four mounting notches 5' for respectively receiving the force sensing units 41 such that the force sensing units 41 abut against the periphery of the flange portion 312.

Figure 10:
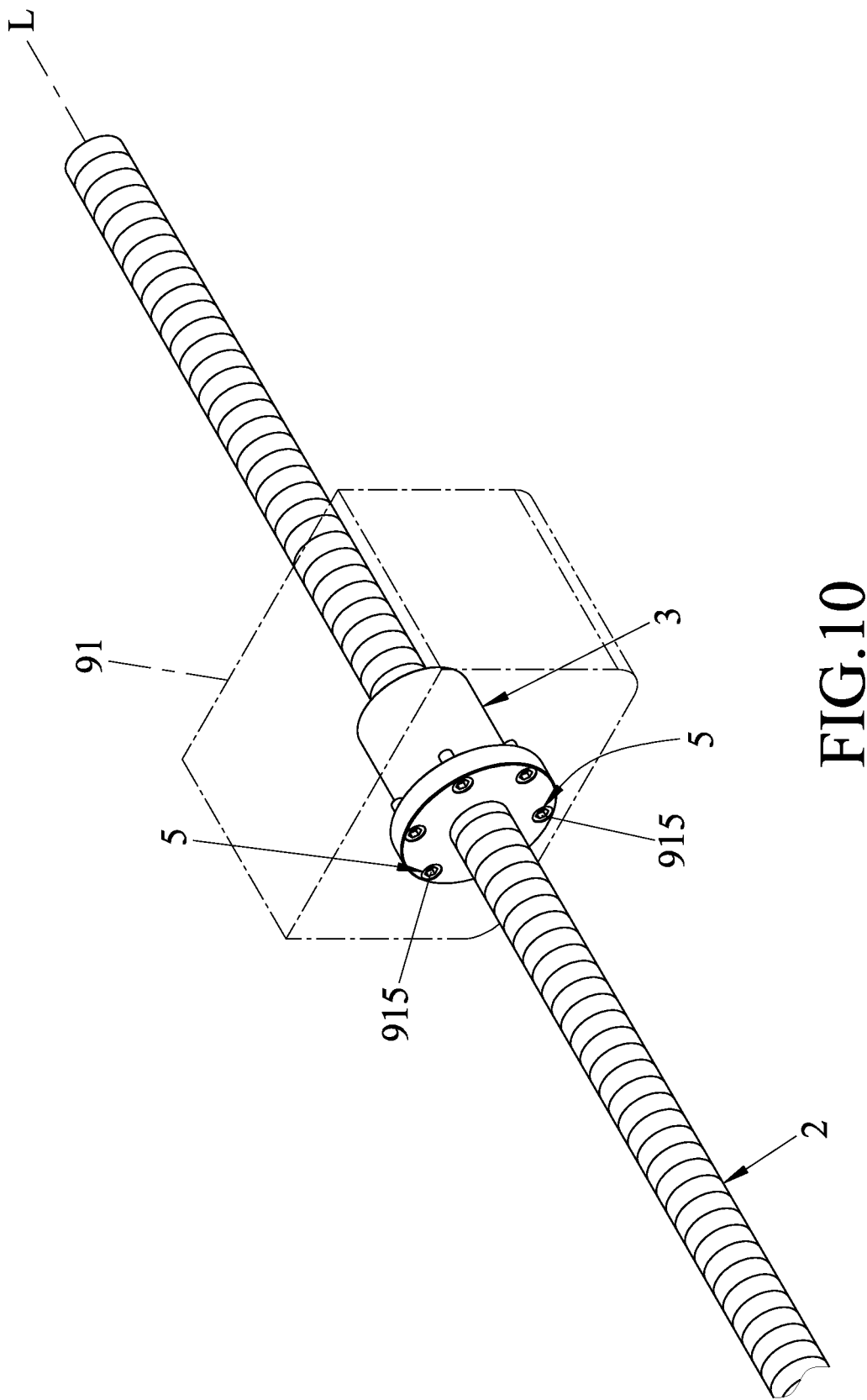
FIG. 10 is a fragmentary perspective view illustrating a fourth embodiment of the ball screw.
Figure 11:
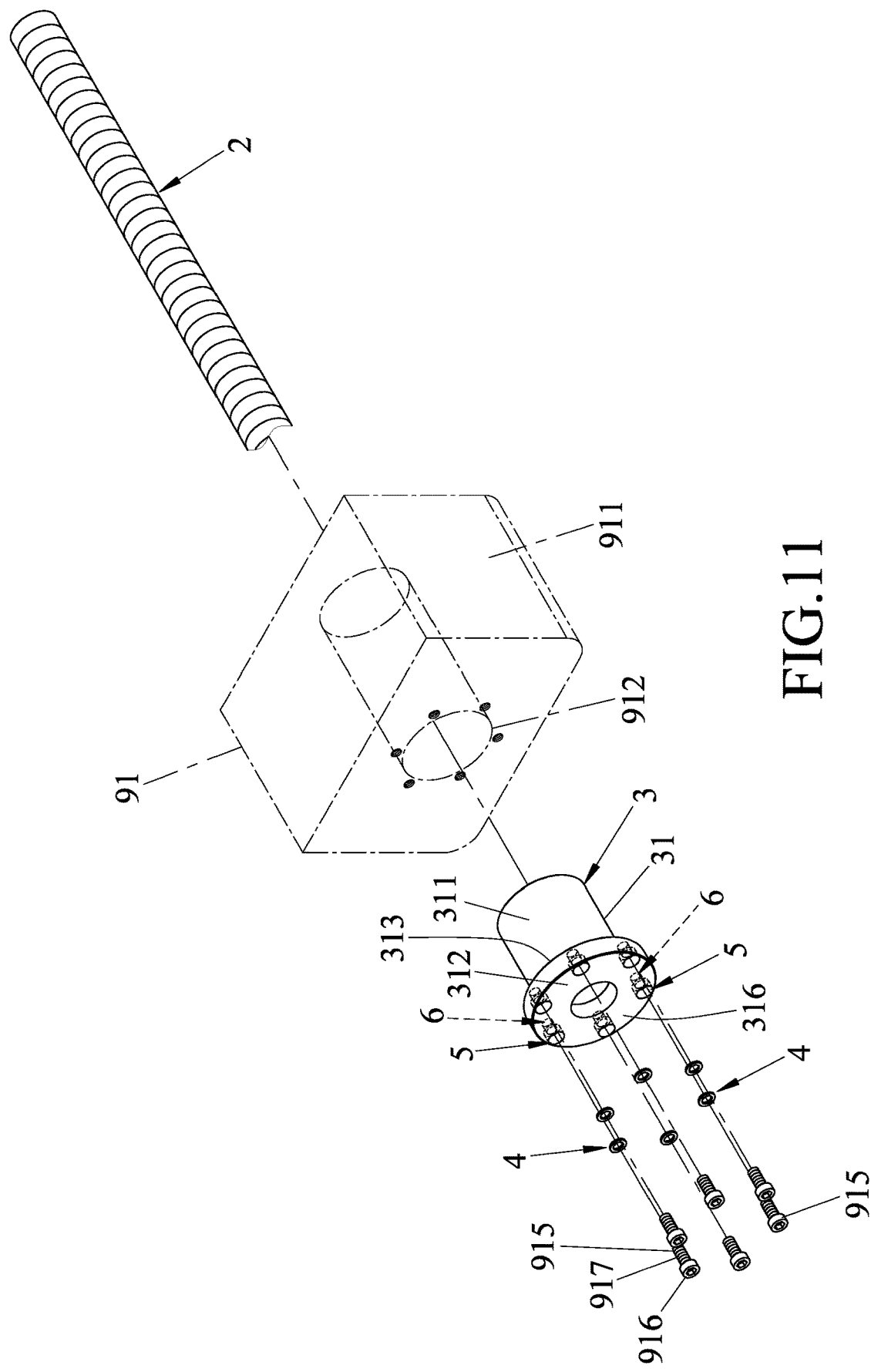
FIG. 11 is an exploded perspective view of the fourth embodiment.

Referring to FIGS. 10 and 11, in a fourth embodiment, the mounting bed 91 also has six screw fasteners 915 threadedly engaged with the base seat 911. Each of the screw fasteners 915 has a head 916 and a threaded shank 917 threadedly engaged with the base seat 911. The mounting notches 5 are formed in the flange portion 312 and concaved from an end surface 316 of the flange portion 312 opposite to the shoulder surface 313 and adjacent to a periphery of the flange portion 312. The reaction force sensing modules 4 are received in the mounting notches 5, respectively, and are engaged with the flange portion 312 to have the screw fasteners 915 extending through the mounting notches 5 and the reaction force sensing modules 4 in the direction of the axis (L) and threadedly engaged with the base seat 911. The ball screw further includes six penetrating slots 6 each of which is formed in the flange portion 312 and extends in the direction of the axis (L) from the shoulder surface 313 to be in communication with a respective one of the mounting notches 5. Each of the reaction force sensing modules 4 is in the form of a ring. Each of the penetrating slots 6 has an inner diameter smaller than that of the respective mounting notch 5. The head 916 of each screw fastener 915 is received in the respective mounting notch 5 and abuts against the respective reaction force sensing module 4. The threaded shank 917 of each screw fastener 915 extends through the respective reaction force sensing module 4 and the respective penetrating slot 6 so as to be secured to the base seat 911.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A ball screw mountable on a mounting bed which is movable in a lengthwise direction, comprising:
    a screw shaft including a cylindrical shaft body which extends along an axis, and a helical external groove which is provided on said shaft body and helically extends about the axis;
    a ball nut including a carrier seat which is rotatably sleeved around said shaft body and on which the mounting bed is disposed, said carrier seat having a carrier portion by which the mounting bed is carried; and
    at least one reaction force sensing module attached to said carrier seat and configured to abut against the mounting bed for measuring a reaction force exerted on the mounting bed by said ball nut during displacement of said ball nut along said screw shaft,
    wherein the mounting bed has:
        a base seat and a mounting hole which extends through the base seat in a lengthwise direction and includes a larger-diameter section and a smaller-diameter section extending therefrom in the lengthwise direction through the base seat, and
        an abutting surface between the larger-diameter section and the smaller-diameter section, and in which said carrier seat is disposed,
    wherein said reaction force sensing module includes:
        a sleeve ring which surrounds the axis, and
        a plurality of force sensing units which are connected to and disposed on an inner peripheral surface of said sleeve ring and which are angularly displaced from each other about the axis,
    wherein said carrier seat has a flange portion which is connected to an axial end of said carrier portion in a direction of the axis, said carrier portion and said flange portion being disposed in the smaller-diameter section and the larger-diameter section, respectively, said flange portion having a cross-section which is transverse to the direction of the axis and which is dimensioned larger than a cross-section of said carrier portion that is transverse to the direction of the axis to form a shoulder surface adjoined with said carrier portion and facing the direction of the axis, said sleeve ring being sleeved on and threadedly engaged with a periphery of said flange portion, and abutting against the abutting surface, said force sensing units abutting against said periphery of said flange portion.

2. The ball screw as claimed in claim 1, wherein said ball screw is disposed to perform a detecting process for determining a deflection of said screw shaft, wherein the mounting bed is disposed to a guide rail assembly which has two guide rails and a saddle that is movable on the guide rails and connected with the mounting bed, and wherein said reaction force sensing module is electronically connected with a control unit such that said ball nut is movable reciprocatively along the axis by rotation of said screw shaft to move the mounting bed along the guide rails to a first position, where a reaction force exerted on the mounting bed by said ball nut is measured by said reaction force sensing module and a first force value representing thereof is recorded by the control unit, and further to a second position, where a reaction force exerted on the mounting bed by said ball nut is measured by said reaction force sensing module and a second force value representing thereof is recorded by the control unit, and such that the control unit determines the deflection of said screw shaft in accordance with the first and second force values.

* * * * *